United States Patent [19]
Vidrine

[11] Patent Number: 4,522,536
[45] Date of Patent: Jun. 11, 1985

[54] APPARATUS FOR AND METHOD OF FLUID SEALING CHANNELED FLANGE CONNECTORS OF UNDER-WATER PIPE LINE SECTIONS

[76] Inventor: Sharon J. Vidrine, Star Rte. Box 279-A, Washington, La. 70589

[21] Appl. No.: 520,929

[22] Filed: Aug. 8, 1983

[51] Int. Cl.³ .............................................. F16L 17/06
[52] U.S. Cl. .................................... 405/168; 285/363; 277/180
[58] Field of Search ....................... 405/168, 169, 170; 285/336, 363, 18, 24, 27; 248/DIG. 9; 277/180, 277/189

[56] References Cited
U.S. PATENT DOCUMENTS

| | | | |
|---|---|---|---|
| 2,111,357 | 3/1938 | Cornell | 248/DIG. 9 |
| 3,094,892 | 6/1963 | Topf | 248/DIG. 9 |
| 3,909,011 | 9/1975 | Sheesley | 277/11 |
| 4,155,571 | 5/1979 | Gastinaux et al. | 285/24 |
| 4,168,852 | 9/1979 | Ahlstone | 285/336 |
| 4,168,853 | 9/1979 | Ahlstone | 285/336 |

Primary Examiner—Dennis L. Taylor
Attorney, Agent, or Firm—James B. Lake, Jr.

[57] ABSTRACT

An o-ring holder and flange connector spacer having an annular body for engaging an o-ring sealer therein and for guide centering between opposing flange connector face channels when digitally inserted between said faces by a radial extension, transversely scored, for respectively preventing loss of fingers without loss of digital control of holder, and for removal of radial extension beyond said score lines after fluid sealing of faces is completed.

2 Claims, 3 Drawing Figures

APPARATUS FOR AND METHOD OF FLUID SEALING CHANNELED FLANGE CONNECTORS OF UNDER-WATER PIPE LINE SECTIONS

BACKGROUND OF THE INVENTION

The invention relates generally to underwater pipeline laying, and more particularly to apparatus for and a method of fluid sealing channeled flange connectors of adjacent pipe sections of underwater pipe line sections.

In laying underwater pipelines, movement and vision of the engaged divers are often limited by roiled waters, and it is practically impossible to hold opposing connector flanges of adjacent pipe sections relatively stationary while inserting o-ring sealers in channels defined on said faces and rigidly joining said flanges. The accurate placing of an O-ring sealer in flange connector channels therefor, and rigidly joining said flanges, and ensuring against the loss of fingers and hands between the relatively moving flanges is taught by the invention.

The prior art teaches pre-positioning ring gaskets in grooved flanged connectiors as in Ahlstone, U.S. Pat. No. 4,168,852-3, and in flanged connectors as disclosed in Gastineau, et al, U.S. Pat. No. 4,155,571; Sheesley, U.S. Pat. No. 3,909,011; and Hagmann, U.S. Pat. No. 3,781,043. None of the cited references discloses a way of precisely and accurately positioning an o-ring sealer in the opposing channels defined in the respectively opposing faces of the pipe end flange connectors of two relatively moving pipe sections just prior to rigidly joining the flange connectors.

SUMMARY OF THE INVENTION

It is an object of the invention to provide apparatus for fluid sealing opposing faces of flange connectors fixed to the ends of pipe sections.

Another object of the invention is to provide a method of fluid sealing adjacent ends adjacent ends of underwater pipe sections, and spacing apart the flange connectors fixed to said pipe section ends, respectively.

DETAILED DESCRIPTION OF THE PREFERRED EMBODIMENTS

Figures 1, 2:
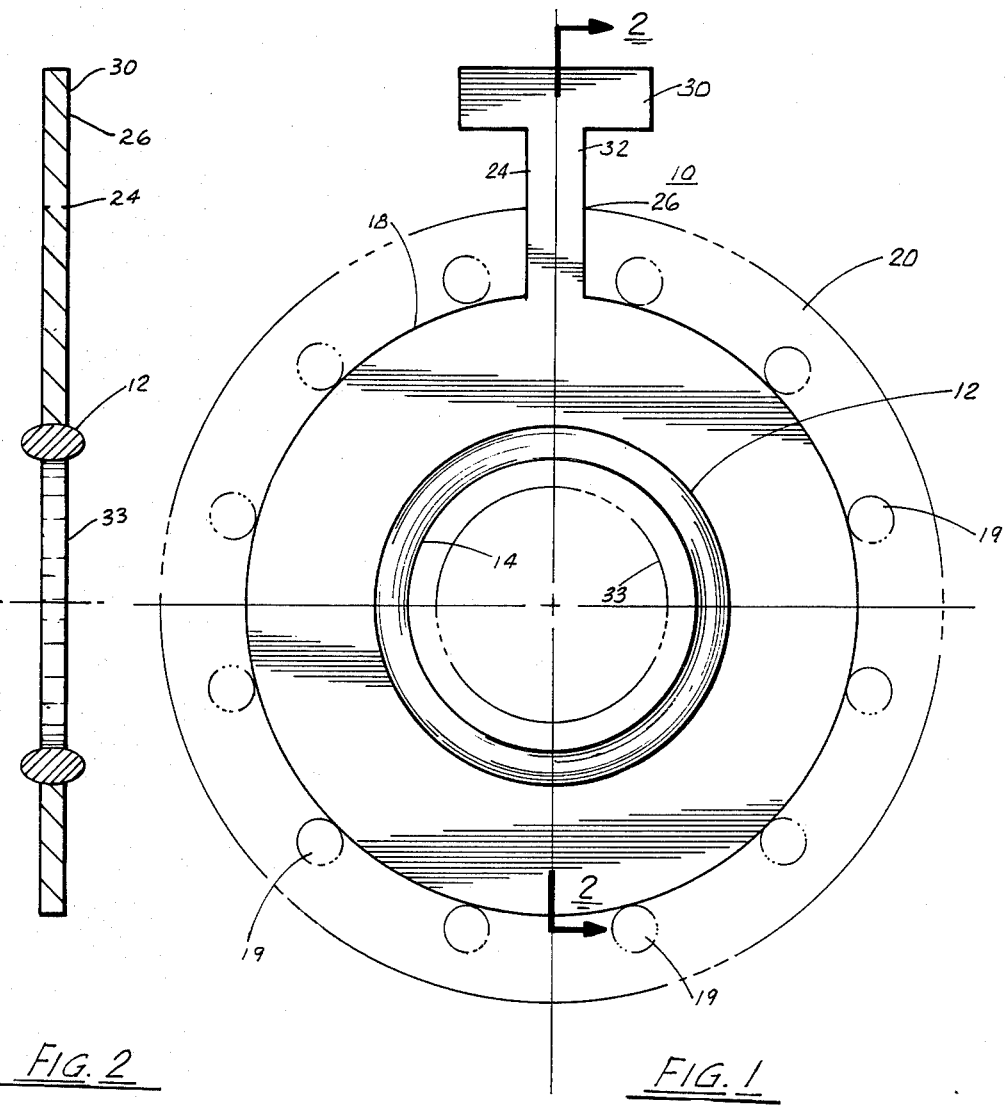
FIG. 1 is a front view of the invention apparatus with a flange connector shown in phantom.
FIG. 2 is a cross-section along section lines 2—2 of FIG. 1.
Figure 3:
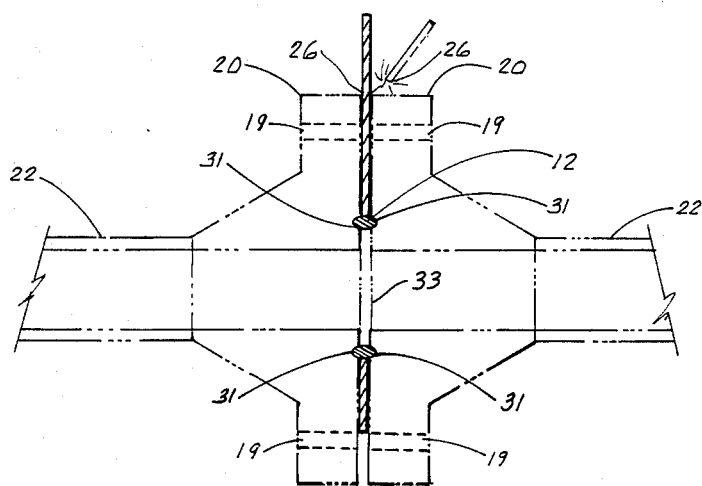
FIG. 3 is a cross-section similar to FIG. 2 of the invention in operating position between two flange connectors.

Referring to FIGS. 1-3, the invention comprises a holder 10 for engaging therein an O-ring sealer 12 within an inner perimeter 14 of an annular body 16. An outer perimeter 18 of annular body 16 is tangent to a circle of bolt holes 19 that are defined through the respective flange connectors 20 which are fixed respectively to adjacent ends of pipe sections 22. A radially extending tab 24 is integral with annular body 16 and defining a score 26 for breakaway at outer perimeter 28 of flange connector 20. A thumb piece 30 extends transversely to a narrow neck 32 of tab 24 for positive digital control in the positioning of holder 10 and for breakaway with part of neck 32 thereafter.

In use, an o-ring sealer is placed in a hole 33 defined by said inner perimeter 14 of annular body 16, in a push-frictional fit. Holder 10 is firmly grasped by thumb piece 30 between thumb and forefinger of a diver and annular body 16 is inserted between flange connectors at the ends of adjacent pipe sections 22, with said fingers remaining clear of said flange connectors. Pre-positioned bolts (not shown) in bolt holes of said circle of bolt holes 19 act as a stop for vertical centering said holder 10 and o-ring sealer 12 between said flange connectors 20 and opposite face channels 31 defined in said respective flange connectors. Bolts similarly inserted in horizontally opposed bolt holes of said circle of bolt holes 19 act as transverse stops for transversely centering said annular body 16 and o-ring sealer 12 with opposite face channels 31. Bolts are then inserted in the remaining bolt holes in said circle of bolt holes, and all bolts tightened to rigidly join said flange connectors 20 and seat said o-ring sealer in the face channels 31 and fluid seal said flange connectors 20. The thickness of annular body 16 spaces the flange connectors apart for operational requirements without affecting said fluid seal.

What is claimed is:

1. Apparatus for fluid sealing channeled flange connectors or underwater pipe line sections, said flange connectors having inner and outer perimeters and opposing annular faces, each defining a circular face channel, and therebeyond a concentric circle of transverse bolt holes for fastening bolts to engage therein, said apparatus comprising:

(a) annular body means defining an inner perimeter, having a greater radius than said flange connectors inner perimeters, for engaging an o-ring sealer adapted to fit in said circular face channels, and defining an outer perimeter adapted to tangentially engage all said bolt holes with said o-ring sealer opposite said flange connectors face channels;

(b) tab means unitary with said annular body and projecting radially outward, normal to and in the place thereof, and scored for breaking flush with outer perimeters of said flange connectors; and (c) a thumb piece unitary with said tab means and extending transversely and in the plane thereof for manually grasping and inserting said annular body and o-ring sealer between said face channels and in engagement therewith, and for breaking off with a part of said tab means at said score thereafter.

2. Method of fluid sealing channeled flange connectors of underwater pipe line sections comprising the steps of:

(a) placing an o-ring sealer concentrically in an annular body having a radial scored extension projecting beyond said flange connectors, and manually grasping said radial extention and inserting said annular body and o-ring sealer up to said extension score between said flange connectors, keeping hands clear thereof (b) inserting bolts in lower bolt holes to act as stops for said annular body in vertically centering it and sealer between said channeled flanged connectors;

(c) inserting bolts in said side bolt holes for acting as stops in similarly centering horizontally said annular body and sealer;

(d) inserting bolts in the remaining bolt holes and tightening all bolts to securely fasten together said channeled flange projectors with said channels enclosing said o-ring sealer and fluid sealing said connection; and (e) breaking off said radial extension at said score line for being of no further use.

* * * * *